United States Patent
Zhang et al.

(10) Patent No.: US 11,150,375 B2
(45) Date of Patent: Oct. 19, 2021

(54) PHASE-BASED ELECTROMAGNETIC SURVEYS FOR GEOLOGICAL FORMATIONS

(71) Applicant: Schlumberger Technology Corporation, Sugar Land, TX (US)

(72) Inventors: Ping Zhang, Albany, CA (US); Nestor Cuevas, Albany, CA (US); Michael Wilt, Walnut Creek, CA (US); Jiuping Chen, San Pablo, CA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 461 days.

(21) Appl. No.: 13/742,923

(22) Filed: Jan. 16, 2013

(65) Prior Publication Data

US 2014/0200808 A1    Jul. 17, 2014

(51) Int. Cl.
    *G01V 3/30*     (2006.01)
(52) U.S. Cl.
    CPC ..................................... *G01V 3/30* (2013.01)
(58) Field of Classification Search
    CPC ... G01V 3/38; G01V 3/30; G01V 3/26; G01V 3/24; G01V 3/18; G01V 3/12; G01V 3/083–086; G01V 3/081; G01V 3/00
See application file for complete search history.

(56) References Cited

U.S. PATENT DOCUMENTS

| | | |
|---|---|---|
| 5,892,361 A | 4/1999 | Meyer, Jr. et al. |
| 7,852,087 B2 | 12/2010 | Wilt et al. |
| 2007/0061080 A1* | 3/2007 | Zhdanov ........................... 702/7 |
| 2009/0278543 A1 | 11/2009 | Beste et al. |
| 2010/0065278 A1 | 3/2010 | Burtz |
| 2010/0231221 A1 | 9/2010 | Rosthal et al. |
| 2011/0050232 A1 | 3/2011 | Wilt et al. |
| 2011/0068795 A1 | 3/2011 | Duvoisin, III |

OTHER PUBLICATIONS

Marsala et al., First Borehole to Surface Electromagnetic Survey in KSA: Reservoir Mapping and Monitoring at a New Scale, Oct. 30-Nov. 2, 2011, SPE Annual Technical Conference and Exhibition, Denver, Colorado, 9 pp.*
One Petro Search Results, Jun. 21, 2021, 10 pp. (Year: 2021).*
Bahr, "Geological noise in magnetotelluric data: a classification of distortion types", Physics of The Earth and Planetary Interiors, vol. 66, 1991, pp. 24-38.

(Continued)

*Primary Examiner* — Toan M Le (57) ABSTRACT

An electromagnetic (EM) data acquisition method for a geological formation may include operating EM measurement devices to determine phase and amplitude data from the geological formation. The EM measurement devices may include at least one first EM measurement device within a borehole in the geological formation, and at least one second EM measurement device at a surface of the geological formation. The method may further include processing the phase data independent from the amplitude data to generate a geological constituent map of the geological formation, and identifying different geological constituents in the geological constituent map based upon the measured amplitude data.

10 Claims, 6 Drawing Sheets

(56) References Cited

OTHER PUBLICATIONS

Baranwal, et al.,"3-D Modelling Study of Borehole-seafloor Marine CSEM for Shallow Water Case", Electromagnetic Methods (EAGE), 71st EAGE Conference & Exhibition, vol. 5, 2009, pp. 3175-3179.

Groom, et al.,"Decomposition of magnetotelluric impedance tensors in the presence of local three-dimensional galvanic distortion", Journal of Geophysical Research: Solid Earth (1978-2012), vol. 94, Issue B2, Feb. 10, 1989, pp. 1913-1925.

Zhang, et al., "Magnetotelluric strike rules", American Geological Institute, Society of Exploration Geophysicists, vol. 52, No. 3, 1987, pp. 267-278.

International Search Report and Written Opinion issued in PCT/US2014/011760 dated Apr. 21, 2014; 14 pages.

Liu, H., Z. Wang, and Z. He, "Frequency-domain 3d borehole-surface electromagnetic modeling by the volume integral equation method," 70th EAGE Conference & Exhibition, 2008.

\* cited by examiner

PHASE-BASED ELECTROMAGNETIC SURVEYS FOR GEOLOGICAL FORMATIONS

BACKGROUND

Electromagnetic (EM) data acquisition may be used to collect information regarding geological formations. This information may be particularly helpful for oil and gas exploration, for example. By way of example, EM data acquisition may be performed using surface-to-borehole, borehole-to-surface, and surface EM surveys.

With respect to surface-to-borehole and borehole-to-surface EM data acquisition, EM sources (i.e., transmitters) and EM receivers are deployed on a terrestrial surface or sea bottom, and in a borehole(s) within the geological formation as well. One or more transmitters broadcasts an EM signal, such as a sinusoid or a square wave, through the earth to be detected by the receiver(s). This approach utilizes galvanic and EM coupling from the EM measurements, which may be used for formation resistivity imaging from the well outwards into the reservoir, for example. The results may be used to help determine the location and constituency of the geological formation, and in particular the fluid reservoirs, within the geological formation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An electromagnetic (EM) data acquisition method for a geological formation may include operating a plurality of EM measurement devices to determine phase and amplitude data from the geological formation. The plurality of EM measurement devices may include at least one first EM measurement device within a borehole in the geological formation, and at least one second EM measurement device at a surface of the geological formation. The method may further include processing the phase data independent from the amplitude data to generate a geological constituent map of the geological formation, and identifying different geological constituents in the geological constituent map based upon the measured amplitude data.

A related well-logging system may include a plurality of EM measurement devices to determine phase and amplitude data from a geological formation. The plurality of EM measurement devices may include at least one first EM measurement device within a borehole in the geological formation, and at least one second EM measurement device at a surface of the geological formation. The system may also include a processor to process the phase data independent from the amplitude data to generate a geological constituent map of the geological formation, and identify different geological constituents in the geological constituent map based upon the measured amplitude data.

A non-transitory computer-readable medium may have computer-executable instructions for causing a computer to perform steps including, for phase and amplitude data determined by a plurality of EM measurement devices from a geological formation, processing the phase data independent from the amplitude data to generate a geological constituent map of the geological formation. The plurality of EM measurement devices may include at least one first EM measurement device within a borehole in the geological formation and at least one second EM measurement device at a surface of the geological formation. A further step may include identifying different geological constituents in the geological constituent map based upon the measured amplitude data.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete Like numbers refer to like elements throughout.

Figure 1:
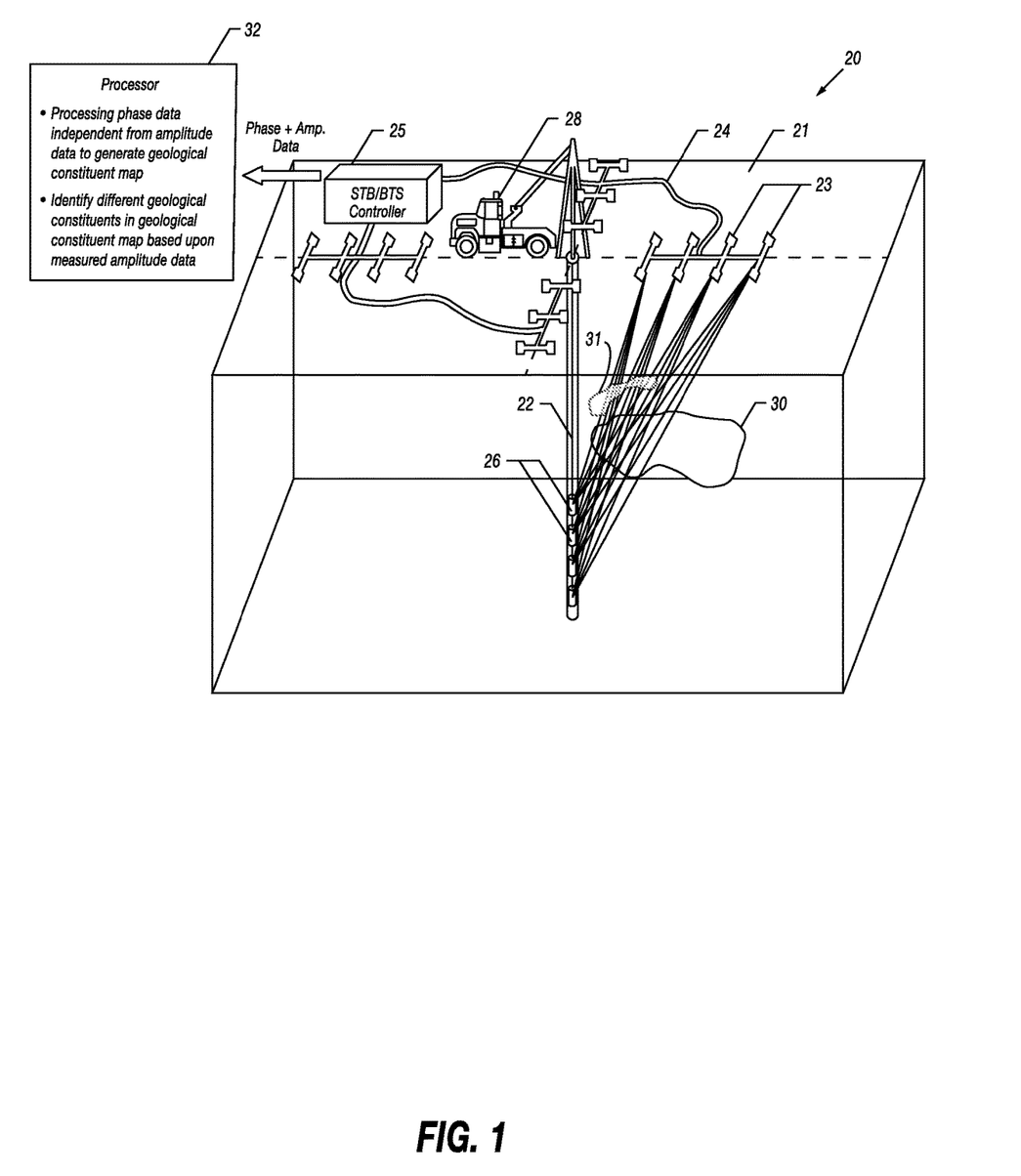
FIG. 1 is a schematic block diagram of a well-logging system in accordance with an example embodiment.

Referring initially to FIG. 1, a well-logging system 20 which may be used to determine constituents or materials within a geological formation 21 based upon surface-to-borehole (STB) or borehole-to-surface (BTS) electromagnetic (EM) measurements is first described. STB and BTS measurements basically differ in whether the EM transmitters are located at the surface of the geological formation 21 (i.e., STB), or whether the EM transmitters are located within a borehole 22 within the geological formation (i.e., BTS). Accordingly, while the following description will be made with reference to STB, it will be understood that the techniques set forth herein may also be applied to BTS configurations.

In the present example, a series or array of EM transmitters or sources 23 are illustratively arranged on the surface of the geological formation 21, and an array of EM receivers 26 are deployed in the wellbore 22. Each transmitter 23 broadcasts an EM signal, such as a sinusoid or a square wave, through the earth to be detected by the receivers 26. The purpose is to use the galvanic and EM coupling from the array of measurements to perform formation resistivity imaging from the well outwardly into the reservoir. The RF transmitters 23 may be a grounded wire type or a magnetically coupled loop, for example. Grounded wires may be appropriate for deeper applications, in lower resistivity formations, or in applications where steel casing is used to line the wellbore 22, for example. Surface loops may be appropriate where the contact resistance is relatively high (e.g., dune sand, frozen ground or volcanic cover), or in relatively shallow applications, for example. The EM transmitters 23 may be connected by power and telemetry cables 24 to a STB (or BTS) controller 25.

EM receivers 26 are positioned within the borehole 22 and may be magnetic field detectors, for example, which may be appropriate where steel well casing is used. Although the EM receivers 26 may be axial or three-component, axially-directed magnetic receiver strings have relatively higher sensitivity to conductive structures. Electric dipole receivers may also be used in open-hole sections, for example, and may be appropriate for hydrocarbon detection. They may be useful in horizontal wells, and may also be deployed as permanent sensors.

Generally speaking, an EM survey is made by placing the receivers 26 in an array covering the depths of interest for each transmitter 23, often by lowering an array of receivers on a wireline cable 22 from a wireline truck 28 (or other suitable platform) that has computers and data storage devices to record the measurements made by the receivers. The receivers 26 may alternatively be placed within the borehole as part of permanent or semi-permanent wellbore completion hardware, on a power and telemetry cable, on slickline, on coiled tubing, or on a drill pipe (e.g., on a logging-while-drilling (LWD) or measurement-while-drilling (MWD) tool string). The depth range may differ for different applications, but a data profile is typically several hundred meters long with stations spaced every few meters above, within, and below the depth range of interest. In some situations, the depth range of interest may be a geologic interval that is suspected of containing a bypassed hydrocarbon deposit or reservoir 30, such as a crude oil and/or natural gas charged reservoir interval that has either not been drained or has been incompletely drained by previous hydrocarbon production activities in the area.

The transmitters 23 may be aligned in a profile emanating from the well in a particular direction, e.g., perpendicular to a geologic strike. While four linear arrays of transmitters 23 are shown deployed in quadrants about a vertical wellbore 22 in the example of FIG. 1, it will be understood by those skilled in the art that transmitters (or receivers) may be deployed in other geometries, and also that the wellbore may also be deviated or have one or more horizontal sections. The surface arrays of transmitters 23 may also be deployed in an areal mode, where one or more transmitters are deployed in accordance with a surface grid pattern, a set of crossed profiles or along a spiral emanating outward from the well. Such embodiments may be appropriate where a surface strike/dip direction is not easily discerned. Such geometries may also be appropriate to deploy for offshore (i.e., sea bottom) applications.

One potential difficulty with STB and BTS EM measurements is that they may be highly sensitive to the presence of conductivity inhomogeneities, such as karst 31 in the shallow subsurface area. Such inhomogeneities yield preferential channeling of the current density. The channeling phenomena may be described with a first order approximation as an accumulation of charges at the boundaries of the three-dimensional (3D) karst 31, which effectively yield secondary sources at the positions of the 3D inhomogeneities. In turn, the secondary sources bias the fields that are recorded away from the primary source, both on the surface 21 of the earth as well as downhole.

Figure 2:
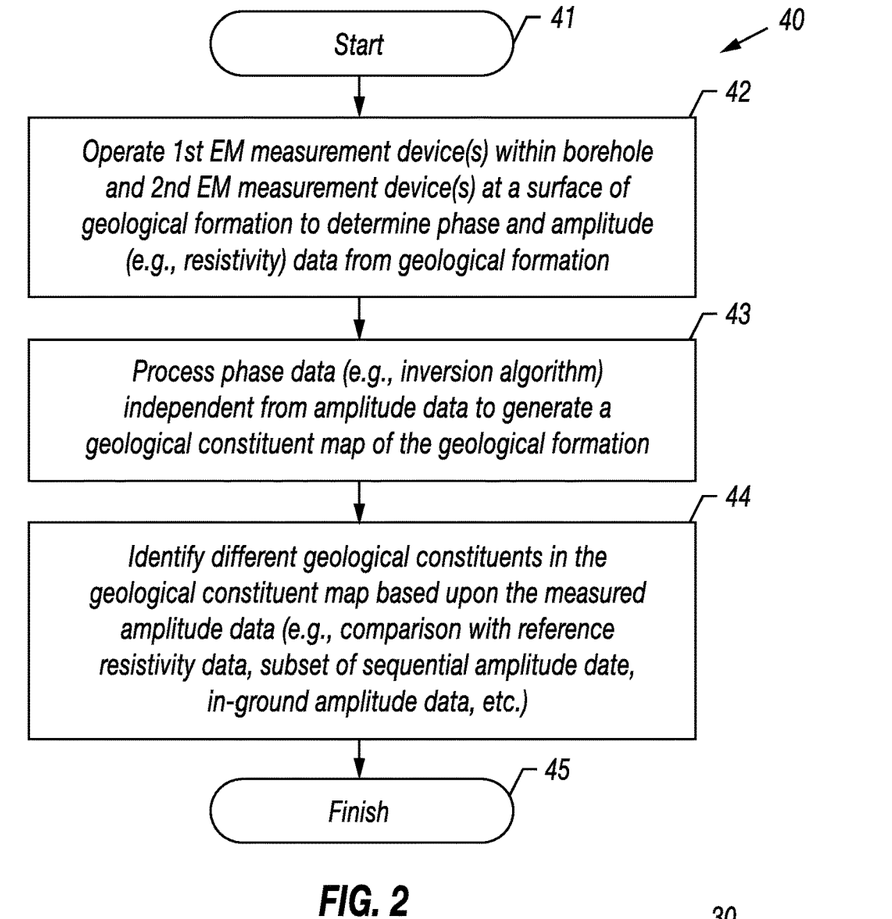
FIG. 2 is a flow diagram illustrating method aspects associated with the well-logging system of FIG. 1.
Figure 3:
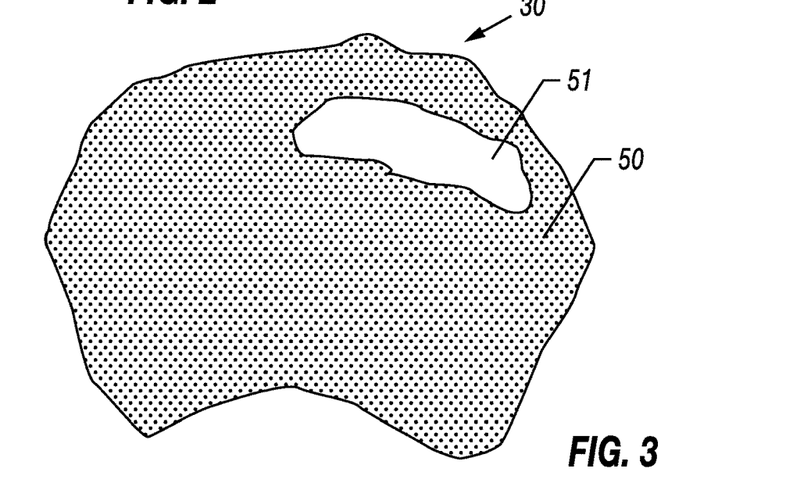
FIG. 3 is a schematic geological constituent map generated based upon the method of FIG. 2.

Referring additionally to the flow diagram 40 of FIG. 2, an approach is now described which may use phase values of the measured EM fields to determine subsurface electrical structure, and accordingly the constituents within the geological formation. Beginning at Block 41, the EM transmitters 23 and receivers 26 may be operated to determine or measure phase and amplitude data from the geological formation, as described above (Block 42). The phase data may be processed by a processor 32 independent from the amplitude data to generate a geological constituent map of the geological formation, at Block 43. An example constituent map of the reservoir 30 is shown in FIG. 3, which illustratively includes crude oil 50, and a region 51 including water. This is possible because the phase of the measured EM fields is much less susceptible to inhomogeneities, such as the karst 31, and may thereby be processed individually to provide an accurate image or representation of the constituents within the geological formation and, more particularly, within the reservoir 30. The processor 32 may be implemented using a combination of hardware (e.g., microprocessor, memory, etc.) and software (e.g., a non-transitory computer-readable medium with the appropriate instructions for causing the hardware to perform the operations described herein).

By way of example, the processor 32 may be used to process the phase data based upon an inversion algorithm. Generally speaking, inversion algorithms are commonly used to process both phase and amplitude data simultaneously. However, as will explained further with reference to example simulation results, the amplitude data is more susceptible to inhomogeneities, and therefore a distortion of the imaging results if the distorted amplitude data is combined with the phase data as part of the inversion processing. Accordingly, the present approach utilizes the relatively unaffected phase data to generate a relatively accurate constituent map of the geological formation (or portions thereof, such as the reservoir 30), separate and independent of the corresponding amplitude data. However, the amplitude data may then be used to identify the different geological constituents in the geological constituent map, at Block 44, which illustratively concludes the method shown in FIG. 2 (Block 45).

More particularly, the amplitude data may correspond to a resistivity of the geological formation, and the identification of the different geological constituents may include comparing the amplitude data to reference resistivity data. That is, resistivity values for gas, crude oil, water, oil/water mixtures, etc., may be measured beforehand, such that a comparison with measured amplitude data for the different constituent materials or regions within the reservoir 30 may be performed using the amplitude of the measured data as a function of space and time to identify these components with a relatively high degree of confidence. However, when inhomogeneities such as the karst 31 is present in the formation, it may not be readily apparent when the measured amplitude data has been effected by these secondary materials.

As such, various approaches may be used to identify and remove or compensate for aberrant amplitude data resulting from inhomogeneities. For example, the EM transmitters 23 may be sequentially operated so that the amplitude data is sequentially collected, meaning there will be respective amplitude data for each of the various positions and angles of the EM transmitters 23. The amplitude data sets may be compared with one another for discrepancies, such as may occur between a reading influenced by the karst 31 and a reading that is not. For those amplitude readings that appear skewed as a result of the karst 31, they may be discarded and not factored into the identification, while the measurements considered to be unaffected may be used for identification purposes (i.e., a subset of the collected amplitude data may be used). Another approach is to scale measurements considered to be affected by the karst 31 (or other inhomogeneities) based upon a measured reference value for the geological formation 21. For example, such a reference measurement may be taken within the borehole (e.g., cross-well measurements, etc.), and the reference value may be used to determine an offset associated with amplitude data measured by the STB configuration. Accordingly, measured amplitude values associated with the constituents in the reservoir 30 may be scaled based upon the in-ground measured reference value, for example, to thereby help identify constituent regions within the formation 21.

Figure 4:
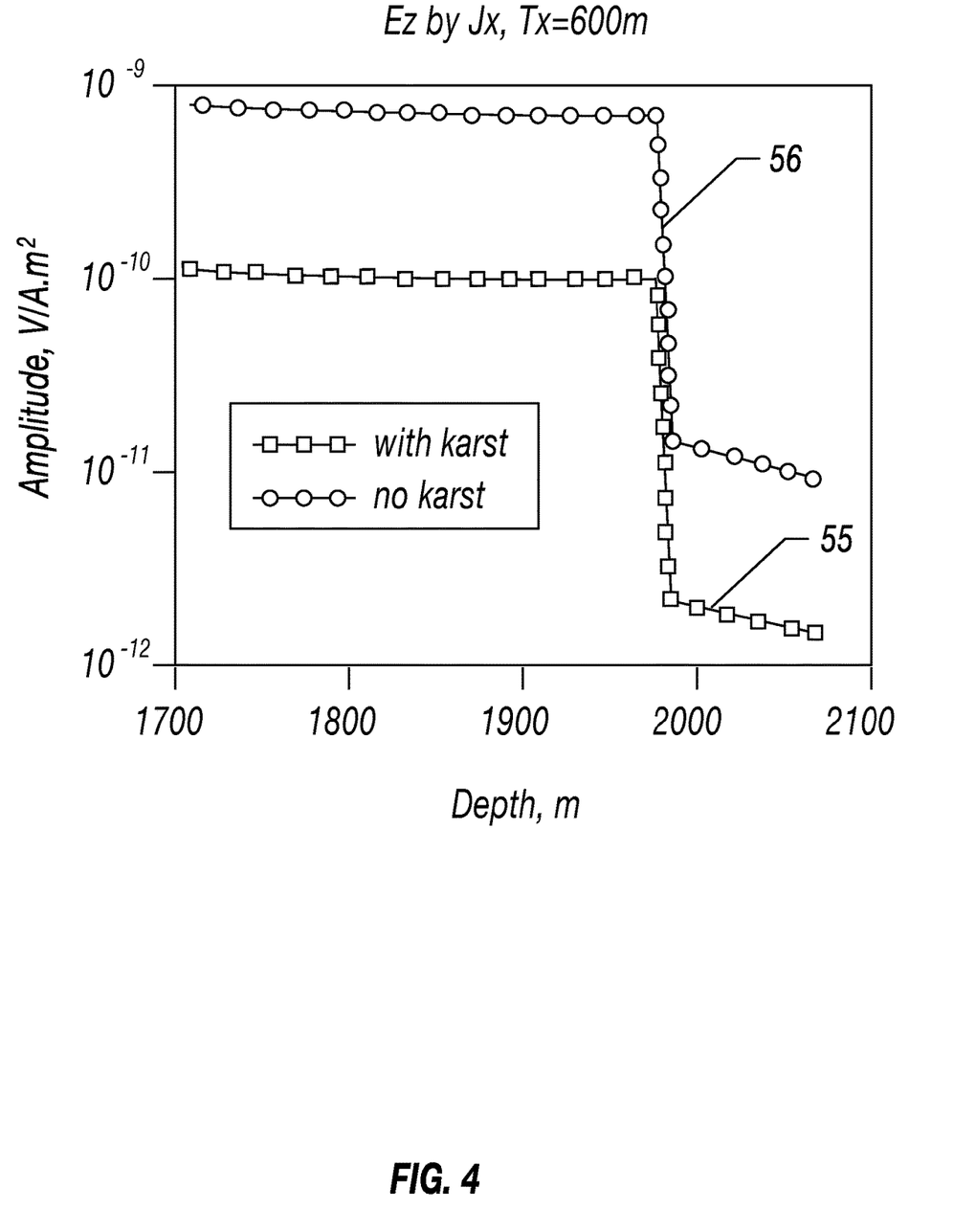
FIG. 4 is a graph of amplitude vs. depth of simulated EM data for an example geological formation with and without the presence of conductive karst in the geological formation.
Figure 5:
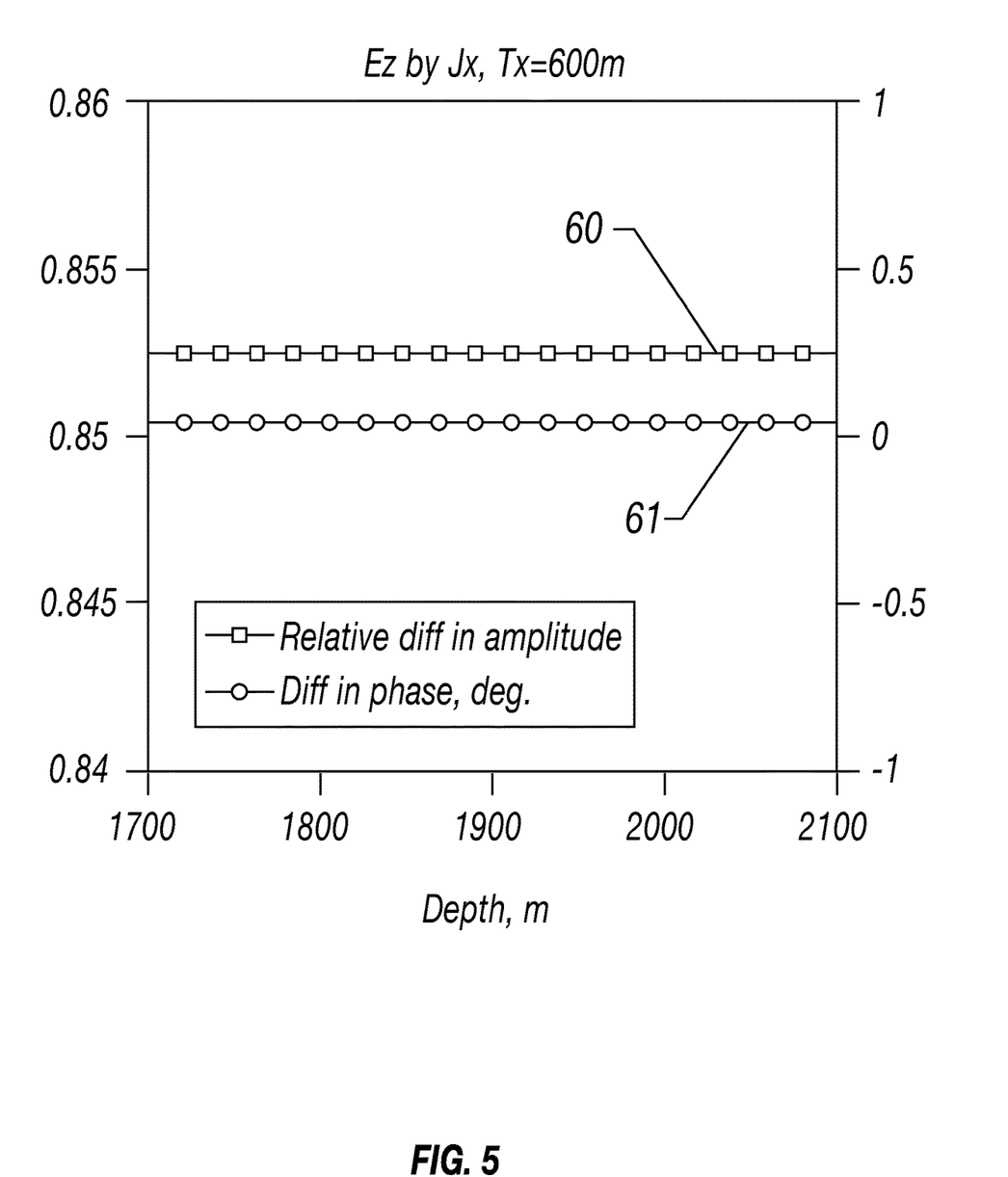
FIG. 5 is a graph of simulated relative differences in phase and amplitude vs. depth for the example of FIG. 4.

The foregoing will be further understood with reference to example simulation results now described with reference to FIGS. 4 and 5. In FIG. 4, amplitudes of vertical electric fields with and without the effects of conductive karst are shown, respectively. The effects on amplitude as a result of the conductive karst are that the amplitude distorted by the conductive karts (plot line 55) is shifted down relative to the undistorted one (plot line 56). Amplitude and phase differences are shown by plot lines 60 and 61, respectively, in FIG. 5. While the amplitude shows an 85% difference, the phase has near zero difference with or without the conductive karst.

Figure 6:
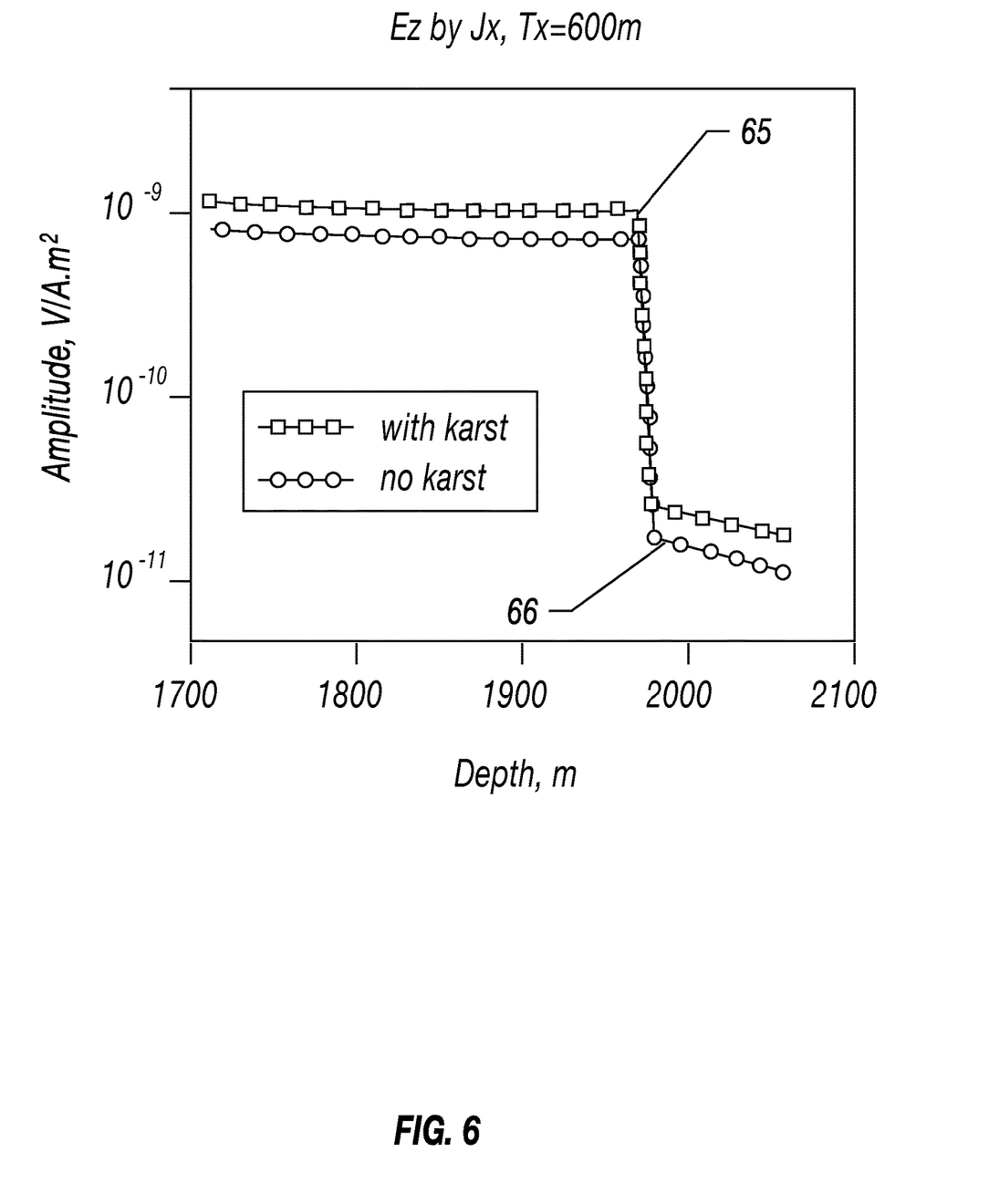
FIG. 6 is a graph of amplitude vs. depth of simulated EM data for another example geological formation with and without the presence of resistive karst in the geological formation.
Figure 7:
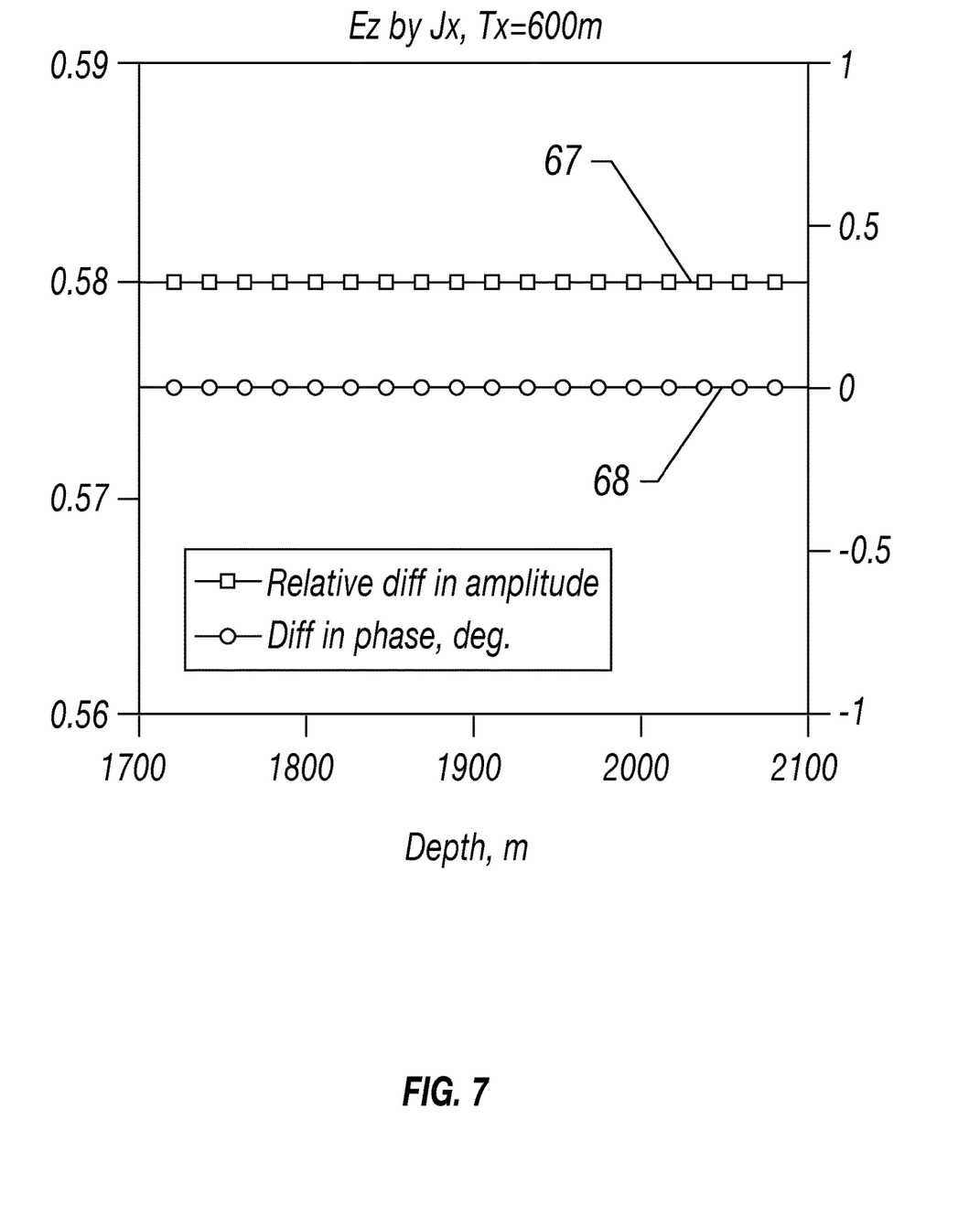
FIG. 7 is a graph of relative differences in phase and amplitude vs. depth for the example of FIG. 6.

Referring additionally to FIGS. 6 and 7, an example in which amplitudes of vertical electric fields are represented with and without the effects of resistive karst. The plot line 65 represents distorted amplitude data which has been affected by resistive karst, while the plot line 66 represents amplitude data for the same simulated geological formation but without being effected by the resistive karst. The distorted amplitude data (plot line 65) is shifted up relative to the non-distorted amplitude data (plot line 66). Here again, FIG. 7 shows the amplitude and phase differences via plot lines 67 and 68, respectively. While the difference between the distorted and non-distorted amplitudes is 58%, the phase once again has a near zero difference with and without the effects of the resistive karst.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. An electromagnetic (EM) data acquisition method for a geological formation, the method comprising:
   operating a plurality of EM measurement devices in a borehole-to-surface (BTS) configuration or a surface-to-borehole (STB) configuration to determine phase and amplitude data from the geological formation, the plurality of EM measurement devices comprising at least one EM receiver and an array of EM transmitters;
   inverting the phase data without the amplitude data to generate a geological constituent map of the geological formation; and
   identifying the different geological constituents in the geological constituent map based upon the amplitude data, with reduced karst effect;
   wherein operating the plurality of EM measurement devices comprises operating each EM transmitter of the array of EM transmitters sequentially to generate separate sets of the amplitude data, and wherein identifying the different geological constituents in the geological constituent map based upon the amplitude data comprises discarding one or more of the separate sets of the amplitude data that appear skewed and using one or more of a remainder of the separate sets of the amplitude data to identify the different geological constituents in the geological constituent map;
   wherein a geological constituent is a fluid, wherein identifying the geological constituents includes identifying the type of fluid, wherein the type of fluid includes at least one of oil, gas, water, oil/water mixtures.

2. The method of claim 1 wherein the amplitude data corresponds to a resistivity of the geological formation; and wherein identifying comprises identifying the different geological constituents by comparing the amplitude data to reference resistivity data.

3. The method of claim 1 wherein the at least one EM receiver comprises an array of EM receivers.

4. The method of claim 1 further comprising determining in-ground amplitude data; and wherein identifying comprises identifying the different geological constituents further based upon the in-ground amplitude data.

5. The method of claim 1, wherein inverting the phase data without the amplitude data to generate the geological constituent map of the geological formation includes separating regions of a reservoir, each region including a different geological constituent and wherein identifying the different geological constituents in the geological constituent map includes identifying the different geological constituent in each region.

6. A well-logging system comprising:
   a plurality of EM measurement devices arranged in a borehole-to-surface (BTS) configuration or a surface-to-borehole (STB) configuration to determine phase and amplitude data from a geological formation, said plurality of EM measurement devices comprising at least one EM receiver and an array of EM transmitters; and
   a processor to
      invert the phase data without the amplitude data with at least one inversion algorithm to generate a geological constituent map of the geological formation, and identify different geological constituents in the geological constituent map based upon the amplitude data, with reduced karst effect;
   wherein each EM transmitter of the array of EM transmitters is configured to be sequentially operated to generate separate sets of the amplitude data, and the processor is configured to discard one or more of the separate sets of the amplitude data that appear skewed and to use one or more of a remainder of the separate sets of the amplitude data to identify the different geological constituents in the geological constituent map;
   wherein a geological constituent is a fluid, wherein identifying the geological constituents includes identifying the type of fluid, wherein the type of fluid includes at least one of oil, gas, water, oil/water mixtures.

7. The well-logging system of claim 6 wherein the amplitude data corresponds to a resistivity of the geological formation; and wherein said processor identifies the different geological constituents by comparing the amplitude data to reference resistivity data.

8. A non-transitory computer-readable medium having computer-executable instructions for causing a computer to perform steps comprising:
   for phase and amplitude data determined by a plurality of EM measurement devices in a borehole-to-surface (BTS) configuration or a surface-to-borehole (STB) configuration at a geological formation, inverting the phase data without the amplitude data with at least one inversion algorithm to generate a geological constituent map of the geological formation, wherein the plurality of EM measurement devices comprise at least one EM receiver and an array of EM transmitters; and identifying different geological constituents in the geological constituent map based upon the amplitude data, with reduced karst effect wherein each EM transmitter of the array of EM transmitters is configured to be sequentially operated to generate separate sets of the amplitude data, and wherein identifying the different geological constituents in the geological constituent map based upon the amplitude data comprises discarding one or more of the separate sets of the amplitude data that appear skewed and using one or more of a remainder of the separate sets of the amplitude data to identify the different geological constituents in the geological constituent map;

wherein a geological constituent is a fluid, wherein identifying the geological constituents includes identifying the type of fluid, wherein the type of fluid includes at least one of oil, gas, water, oil/water mixtures.

9. The non-transitory computer-readable medium of claim 8 wherein the amplitude data corresponds to a resistivity of the geological formation; and wherein identifying comprises identifying the different geological constituents by comparing the amplitude data to reference resistivity data.

10. The non-transitory computer-readable medium of claim 8 wherein identifying comprises identifying the different geological constituents further based upon in-ground amplitude data.

* * * * *